United States Patent [19]

Amelio

[11] 4,238,971
[45] Dec. 16, 1980

[54] RELEASABLE PUSH-PULL SHEATHED CABLE CONTROL SYSTEM

[75] Inventor: Armand F. Amelio, Yonkers, N.Y.

[73] Assignee: United Technologies Corporation, Hartford, Conn.

[21] Appl. No.: 970,763

[22] Filed: Dec. 18, 1978

[51] Int. Cl.³ .......................... G05G 9/00; F16C 1/26; F16D 9/00
[52] U.S. Cl. .............................. 74/471 R; 74/501 R; 248/548; 403/2
[58] Field of Search ............. 74/501 R, 501 P, 471 R, 74/501.5 R; 248/548, 56; 403/2

[56] References Cited

U.S. PATENT DOCUMENTS

| | | | |
|---|---|---|---|
| 2,480,083 | 8/1949 | McMillan | 74/471 |
| 2,595,134 | 4/1952 | Gordon | 74/501 R |
| 4,185,516 | 1/1980 | Betlinski | 74/501 R |

Primary Examiner—Kenneth Dorner
Attorney, Agent, or Firm—Vernon F. Hauschild

[57] ABSTRACT

A releasable push-pull sheathed cable control system in which the sheathed cable extends between the control input and the control output and includes a looped portion fixed at one end and releasably fixed at its other end so that tension or compression loading of the cable following cable jamming anywhere within the sheath or therebeyond in a control system will cause deformation or the looped portion and release of one end of the sheathed cable.

16 Claims, 5 Drawing Figures

U.S. Patent  Dec. 16, 1980  Sheet 2 of 2  4,238,971
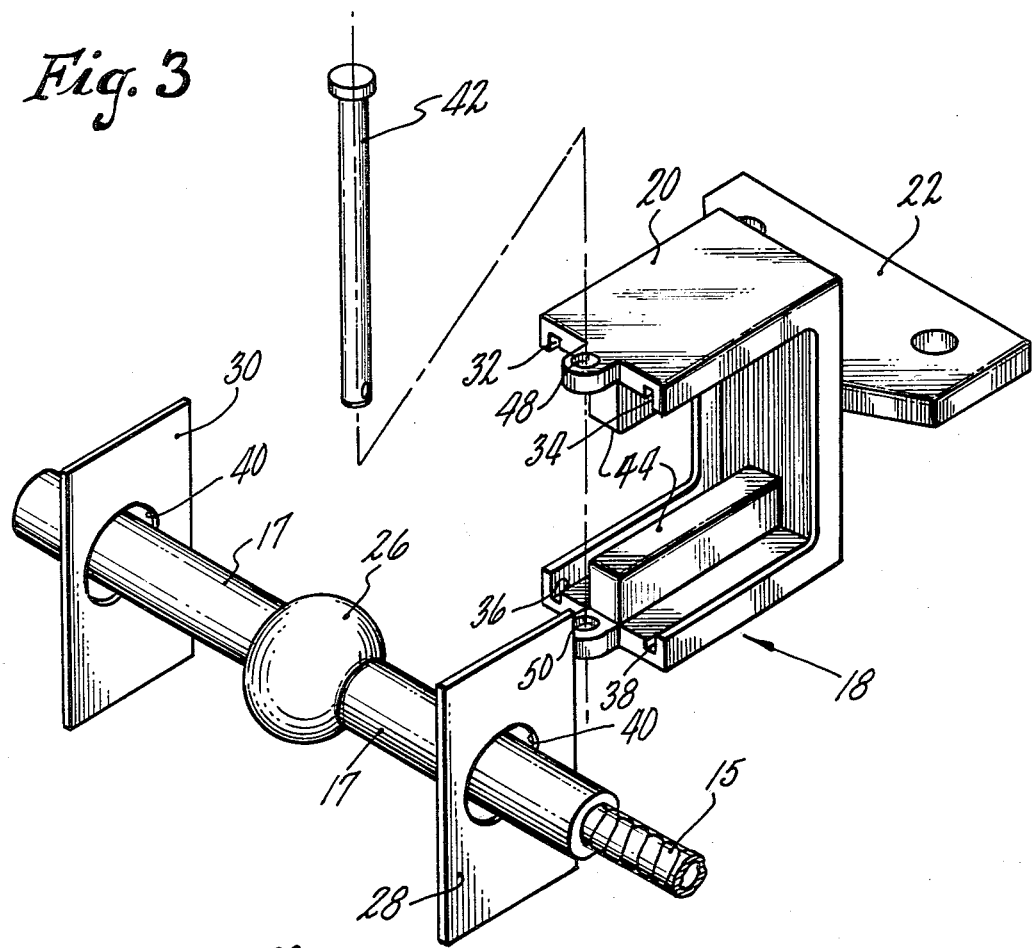
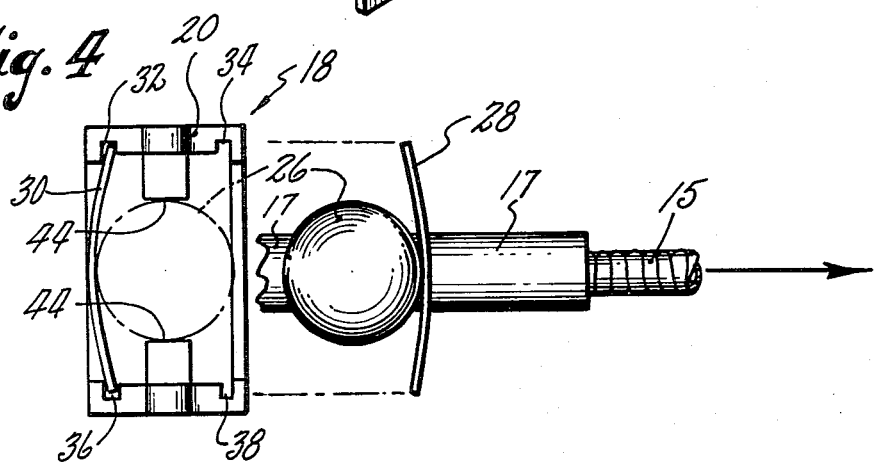
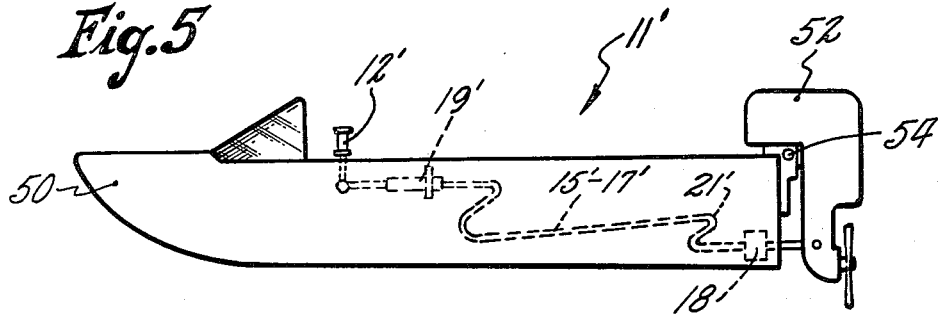

RELEASABLE PUSH-PULL SHEATHED CABLE CONTROL SYSTEM

BACKGROUND OF INVENTION

1. Field of Invention

This invention relates to a control system in which a looped cable is actuated in push-pull fashion within its sheath, which sheath extends for substantially the full length of the cable, is fixed in position at one of its ends and releasably fixed in position at its other end so that tension or compression loading of the cable after jamming of the cable anywhere within the sheath or beyond the sheath in the control system will cause the looped sheathed cable to deform and release one end of the sheathed cable.

2. Description of the Prior Art

No prior art is known which performs this cable positioning and jammed cable release function when a jam occurs between the cable and the sheath anywhere along the sheath and anywhere in the control system beyond the sheath. While U.S. Pat. No. 3,572,160 to Stahr shows a wire movably positioned within a sheath, this patent does not address itself to the jammed cable release feature of my invention. U.S. Pat. No. 1,983,368 to Hathorn also shows a control system in which a sheathed cable is supportably positioned but this patent has no jammed cable release provisions. U.S. Pat. No. 3,048,356 to Curtis et al shows a cable positioned within a bulkhead seal and has the capability of releasing the cable in case of an icing condition between the cable and seal but only if the icing condition takes place at the seal.

SUMMARY OF THE INVENTION

A primary object of the present invention is to provide a control system including a sheathed cable in which the cable is movable in push-pull fashion within the sheath so as to impart motions from the control input to the control output, wherein the sheathed cable includes a looped portion, and wherein the sheath is fixed at one end and releasably fixed at the other end, so that jamming of the cable within the sheath or the jamming of related linkages beyond the cable will cause the looped portion to deform in response to the application of tension or compression cable loading following jamming, to thereby release the sheath and cable at its releasably retained end.

In accordance with the present invention, the push-pull cable is reeved through a sheath member having a ball swaged thereon at the sheath releasable end. The ball member is positioned within a housing and retained in that position by flexible spring members during normal operation. Should the cable jam anywhere within the sheath or should a jam occur in the control system beyond the sheath, axial loading of the cable will cause the ball to bear against the flexible spring member so as to free the jammed cable, sheath and ball from the housing.

Other objects and advantages of the present invention may be seen by referring to the following description and claims, read in conjunction with the accompanying drawings.

BRIEF DESCRIPTION OF THE DRAWINGS

FIG. 3 is an exploded view of my sheathed cable releasable positioner.

FIG. 4 corresponds to FIGS. 2 and 3 but shows the positioner in its released condition.

FIG. 5 is a showing of my invention in a single control system which permits remote control of outboard motor trim on a boat.

FIG. 1 shows a practical embodiment of my invention forming part of the collective biasing control 10 in a helicopter flight control system 11. In a helicopter flight control system 11, collective biasing control 10 is connected between the output of the pilot operated collective stick 12 and the engine fuel control 13 to eliminate steady state engine speed droop and reduce transient engine speed droop when collective pitch is increased by the collective stick operation of the blade pitch control 14. It will be noted by viewing FIG. 1 that since the pilot collective stick 12 operates both the collective bias control 10 and the blade pitch control system 14, jamming of the collective bias control 10 will prevent the pilot from utilizing his collective stick 12 to control blade collective pitch through control 14. It is accordingly important that the pilot be able to overcome a jammed condition in control 10.

Figure 1:
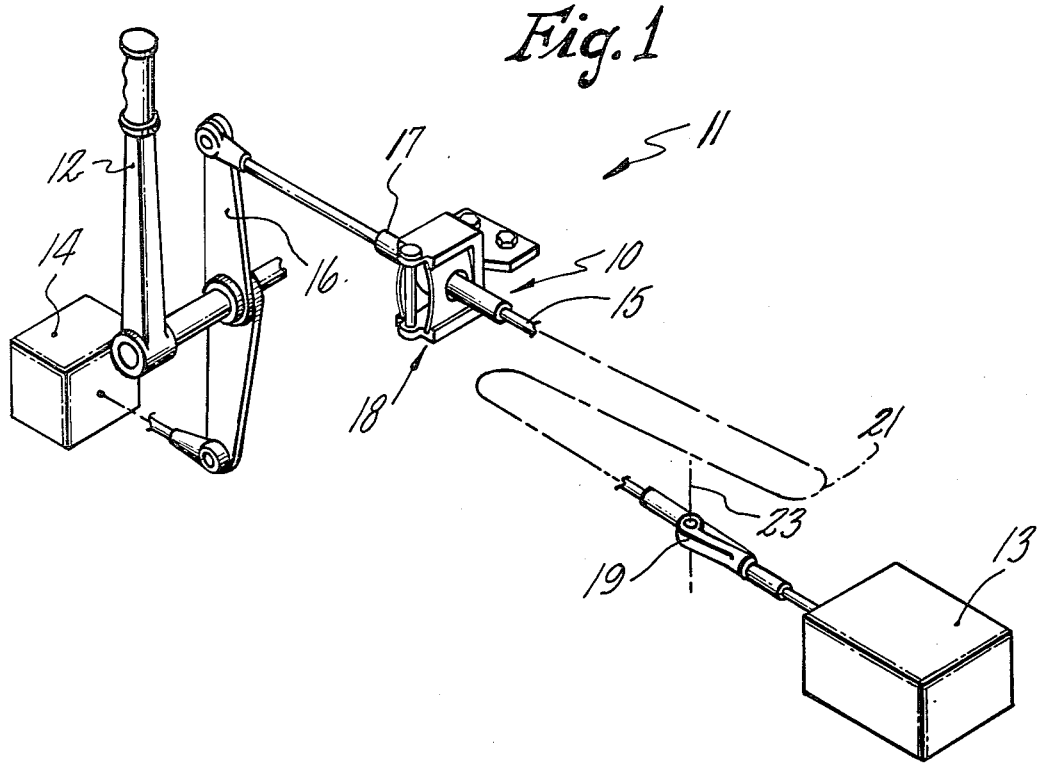
FIG. 1 is a showing of my invention in an aircraft flight control system in which a single control input generates a plurality of control outputs.

Control 10 is basically a cable member 15 extending between the collective stick control crank arm 16 and the engine fuel control 13. Control cable 15 is enveloped with sheath 17 for push-pull motion therewithin in response to the motion of collective stick 12. Sheath 17 is fixed in position by my releasable positioning means 18 at one of its ends and by positioning means 19 at its other end. The sheathed control cable includes looped portion 21 between sheath positioning members 18 and 19. Sheath positioning member 19 is preferably supported from the fuselage for pivot motion about axis 23, but could be universally mounted by utilizing a ball joint supported from the fuselage.

Figure 2:
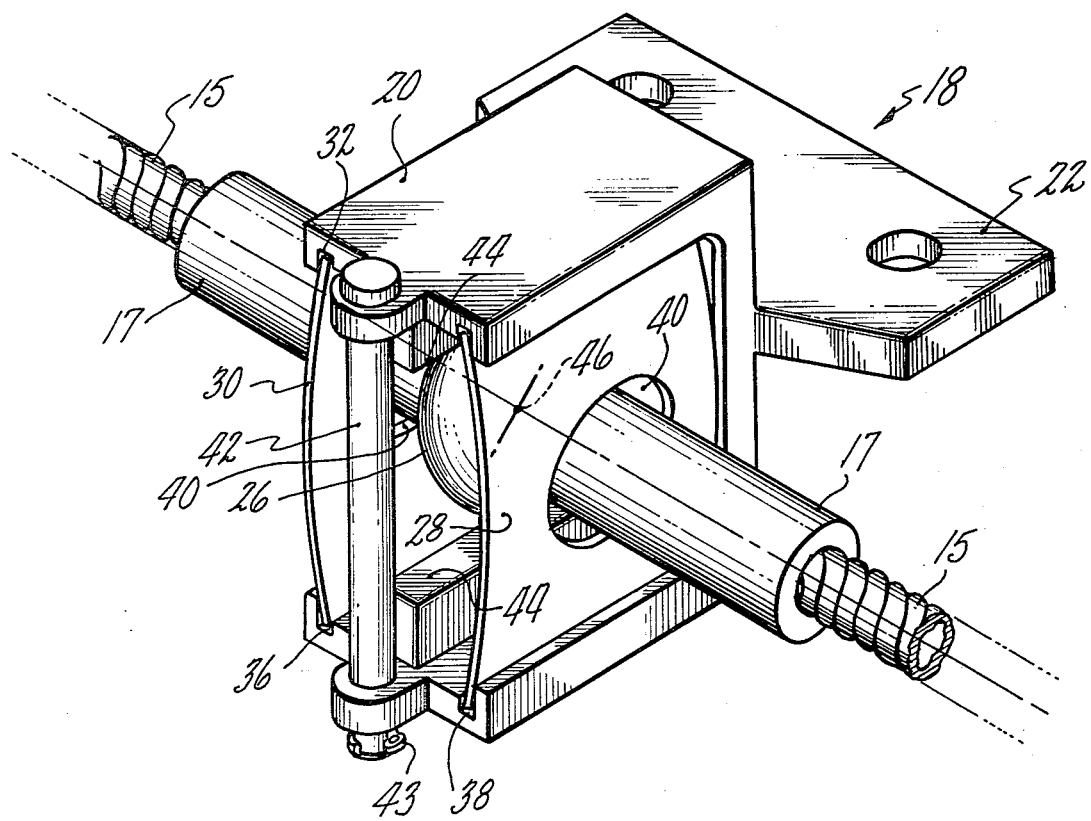
FIG. 2 is a showing of my releasable sheathed cable positioner in its operable position.

During normal operation of my FIG. 1 flight control system, pilot imparted motion to collective stick 12 causes input crank 16 to impart either a push or a pull motion to cable 15. Reacting against fixed sheath 17, cable 15 imparts either a push or a pull motion signal to engine fuel control 13. At the same time, the pitch of the helicopter blades is caused to change collectively due to the operation of conventional blade pitch control 14 caused by the same collective stick 12 motion. It will be evident that if a jam should occur in collective biasing control 10, such jam would serve to inactivate the collective stick 12 and hence cause control 14 to become inoperative. It is therefore imperative that the pilot be able to free his collective stick 12 from the jammed control 10 to permit the collective stick to continue to provide the necessary control input functions to pitch control 14. To permit the freeing of the collective stick 12 from the jammed control system 10, one end of sheath 17 is releasably positioned by member 18 so that, if a jam should occur between the cable and the sheath anywhere within the sheath, or if a jam should occur in control 13, the application of either tension or compression loading onto the cable 15 by the pilots input to collective stick 12, since such cable 15 loading is reacted by sheath 17, will cause a deformation of cable-sheathed loop portion 21, to thereby cause the jammed sheath and cable to impose an axial loading on releasable positioning means 18 so as to free the jammed cable and sheath therefrom, and thereby free the collective stick 12 from jammed system 10 to permit the collective stick 12 to continue to perform its other control functions. For a better understanding of the operation of my releasable sheathed cable positioning means 18, reference will now be made to FIGS. 2, 3 and 4.

A typical collective biasing control is shown in my U.S. Pat. No. 3,758,053 with Daniel J. Maples entitled "Dual Input Control" and granted Sept. 11, 1973. A typical pitch control, such as 14 in FIG. 1, is shown in U.S. Pat. No. 3,199,601 to Dean et al granted Feb. 2, 1962.

Sheath positioner 18 is shown in greater particularity in FIG. 3 and includes housing member 20, which is fixedly attached to the fuselage through bracket 22. Sheath member 17 which is a rigid or flexible cylindrical tube extends through housing 20, and has ball member 26 connected by swaging or otherwise to the outer periphery thereof, the ball member being of greater cross section area than the sheath 17. Ball 26 and sheath member 17 may be integral. Flexible spring retainers 28 and 30 are positioned on opposite sides of ball 26 and a portion of the periphery of members 28 and 30 engage grooves 32, 34, 36 and 38 in housing 20. Sheath member 17 extends through an aperture, such as 40, in each spring member 28 and 30. Bolt member 42 extends through aligned apertures in housing 20 and is secured in position by conventional means, such as cotter pin 43, so as to cooperate with spring members 28 and 30 to position ball 26 within housing 20. Cable 15 is reeved through sheath 17 so as to be movable back and forth therewithin in push-pull control fashion. Guiderail 44 extends inwardly and forms part of housing 20 and is a selectively sized with respect to ball 26 so that housing 20 supports ball 26, when member 18 is in its FIG. 2 operative position, to be universally movable about ball center 46.

The construction and operation of cable positioner 18 can better be understood by viewing FIG. 3, an exploded view thereof. In FIG. 3 it will be noted that housing 20 is of C-shaped cross section and has guiderail 44, which is also of C-shaped cross section, therewithin. Housing 20 includes aligned apertures 48 and 50. With housing 20 secured to the fuselage through connecting flange 22, and with retaining ball 26 swaged onto sheath 17, and with retaining springs 28 and 30 reeved over sheath 17, and with cable 15 extending through sheath 17, retaining ball 26 is inserted into guiderail 44 at the same time that the periphery of spring retainers 28 and 30 are being slid into housing grooves 32-38. Once sheath 17, ball 26 and retainer springs 28 and 30 are in their FIG. 2 assembled position, bolt member 42 is inserted through aligned apertures 48 and 50, and fixedly positioned therein, so that cable 15 is positioned at a selected station determined by the location of cable positioner 18, cable 15 can be moved back-and-forth therethrough in push-pull control fashion, and has universal angular flexibility about ball center 46. This would be the normal operating position of cable retainer 18. With cable positioner 18 so positioned as in FIG. 2, and if used in the FIG. 1 environment, the motions of collective stick 12 would impart a collective bias through control 10 to engine fuel control 13.

In the event that cable 16 becomes jammed anywhere within sheath 17 or if a jam should occur beyond sheath 17, for example, in control 13, such could prevent the operation of the collective stick 12. It is therefore necessary that cable positioner 18 be constructed so that the application of adequate tension or compression loading on cable 16 following such a jam will cause the freeing of cable 16, sheath 17 and ball 26 from positioner 18.

Following a jam of cable 15 anywhere along the length of sheath 17, or following any jam which might occur beyond sheath 17, for example within control 13, if the pilot applies an adequate amount of tension compression loading to the cable 15, such will be reacted by sheath 17 so as to change the shape of looped portion 21 and impose an axial loading on the cabled sheath within support member 18. This axial sheathed cable loading on support mechanism 18 will serve to release the sheathed cable therefrom.

This jammed cable release function is best understood by viewing FIG. 4 in which it is assumed that a rightward tension load is applied to a jammed cable 15. This rightward load applied to jammed cable 15 would cause sheath 17, and ball 26 to move rightwardly. Such motion of ball 26 would impart a force in a rightward direction to spring retainer 28, thereby causing the spring retainer 28 to deflect and slip out of housing grooves 34 and 38 to thereby free for push-pull motion cable 15, sheath 17 and ball 26 so that the collective stick 12 is fully operative. It will be understood that had a leftward tension load been applied to cable 15, ball 26 would have released spring retainer 30, and hence cable, sheath and ball, to free the collective stick 12.

It will be obvious to those skilled in the art that my cable positioner 18 could of been constructed in a variety of ways without departing from my invention, for example, selectively positioned projections, akin to a screw head or rivet head, could project from housing 20 to be engaged by the periphery of spring members 28 and 30, as a substitute for grooves 32-38. Further, housing 20 could be of square cross section, however, for ease of assembly, the utilization of removable bolt 42 is deemed desirable. Still further, any shaped bulbous member could have been swaged or otherwise connected to the outer periphery of sheath 17, but ball member 26 is well adapted to provide the universal angular motion desired.

In a modified construction, preloaded springs could also be positioned in housing 20 to act against ball 26, so that any jamming of the push-pull cable 15 could be overcome by compressing the appropriate spring in the direction of the signal input and therefore prevent the collective pitch control from becoming also jammed. However, reaction from the compressed spring will continuously feed back an undesirable signal into the flight controls. The preferred construction of FIG. 2 releases the jam without effecting the flight controls, and imparts no signal thereto during normal operation.

FIG. 5 illustrates another control embodiment in which my invention could be utilized. In FIG. 5, reference numerals which are common to the FIGS. 1-4 construction will be used but in prime form. FIG. 5 shows sheath cable control 11' utilized as an outboard motor trim control to permit the pilot to remotely trim the outboard motor so as to correct the boat attitude as required by passenger positioning or other variable conditions. FIG. 5 shows a conventional boat 50 powered by outboard motor 52, which is supported from the stern so as to be pivotable about pivot point 54. The pilot, who will be located amidship or forward thereof, or at another location remote from outboard motor 52, will wish to trim outboard motor 52 so as to adjust the attitude of boat 50 in the water when carrying different passenger loading, and to accommodate different passenger distribution within the boat, or other variable conditions. Sheathed cable control 11' permits the pilot to do this remotely. In the FIG. 5 environment, the sheathed cable 16'-17' extends between sheath positioner 19' and releasable sheath positioner 18', and has looped portion 21' therebetween. During normal operation, the pilot can operate control stick 12' so as to cause cable 16' to react within anchored sheath 17 and move therewithin in push-pull fashion to adjust the trim of outboard motor 52, to which cable 16' attaches. Should boat 50 encounter some emergency condition, such as heavy debris in the water in the form of a heavy log or the like which strikes against outboard motor 52, it is important to prevent damage to outboard motor 52. Accordingly, the outboard motor 52 should be immediately released from control system 11' to permit the outboard motor to freely pivot about 54 in response to debris impact loading. My control system will provide this immediate release in that this debris impact loading will impose the necessary axial loading on releasable sheath cable positioner 18' so as to cause release of the sheathed cable therefrom and hence permit outboard motor 52 to pivot freely about pivot point 54 as permitted by playing out the excess sheathed cable provided by looped portion 21'. It will be noted that in my FIG. 5 environment, the push-pull cable control system is not linked to a second control system as in the FIG. 1-4 environment.

In the FIG. 5 embodiment, my control system 11' also serves the additional function of locking motor 52 so that it will not swing into the boat when operating in reverse. A separate lock is usually required for this purpose but my system 11' performs both the motor lock function and provides the capability of pilot tilt control when motor 52 is operating in reverse.

It will further be evident to those skilled in the art that my control system could be used in a two sheathed cable control system in which each cable had two fixed points, one such fixed point for each cable being the releasable sheathed cable connection identified here as reference numeral 18 herein.

I wish it to be understood that I do not desire to be limited to the exact details of construction shown and described, for obvious modifications will occur to a person skilled in the art.

I claim:

1. A control system comprising:
(A) a control cable adapted to extend between the control input and output and shaped to form at least one looped portion;
(B) a sheath enveloping the cable and extending for substantially the full length thereof so that said cable may be moved within said sheath in push-pull fashion,
(C) first means fixedly positioning said sheath at one end of said looped portion,
(D) second means to fixedly position said sheath at the other end of said looped portion during normal control system operation and to release the sheath and cable in response to attempted push-pull cable following a cable jam anywhere within the sheath or within the control output, thereby establishing compression or tension loading on the cable within the sheath resulting in deformation loading on the cable-sheath loop portion to be reacted by the first and second positioning means and thereby release the cable and sheath from the second positioning means, said second positioning means comprising:
(1) a housing adapted to be fixed in position,
(2) a ball member connected to the exterior of such sheath and positioned in said housing,
(3) spring members positioned on opposite sides of said ball member, and
(4) means to releasably secure said spring members in said housing so that said spring members and said ball member are normally positioned by said housing and so that, if the cable jams anywhere within the sheath or the control output, sufficient tension or compression loading of the cable will cause deformation of the cable-sheath loop portion and thereby cause said ball member to bear against one of said spring members so as to cause deflection thereof and release thereof from said housing member, to thereby free the jammed cable, sheath and ball member from said housing.

2. Apparatus according to claim 1 wherein said ball member is swaged onto the sheath which is adapted to have the cable member reeved therethrough for push-pull motion therethrough, said ball member being sized so as to be mounted in said housing to support the ball member, sheath and cable for universal motion about the ball center.

3. Apparatus according to claim 2 wherein said spring members are flexible plate members and wherein said securing means are grooves in the housing shaped to receive at least a portion of the periphery of the spring members.

4. Apparatus according to claim 3 wherein said housing is of C-shaped cross section having an open end and including a releasable bolt-type member extending across the open end of the housing to cooperate with the spring members in positioning the ball member within the housing.

5. Apparatus according to claim 4 and including a guiderail in said housing engaging said ball member to position and support the ball member for universal motion about the ball center.

6. An aircraft flight control system comprising:
(A) a first controlled element,
(B) a second controlled element,
(C) movable control means connected to control both said first and second controlled elements by motion of the control means including:
(1) a cable member extending between said movable control means and said first controlled element and shaped to form at least one looped portion,
(2) a sheath member enveloping said cable and extending for substantially the full length thereof so that said cable may be moved within said sheath in push-pull fashion by movement of said control means,
(3) first means fixedly positioning said sheath at one end of said loop portion,
(4) second means spaced along said sheath from said first means and operable to fixedly position said sheath at a second station therealong at the opposite end of said loop portion during normal control operation and to release the sheath and cable in response to push-pull motion of said control means following a cable jam within the sheath or within the first controlled means thereby establishing compression or tension loading on the cable resulting in deformation loading on the cable loop portion to be reacted by the first and second positioning means and thereby release the cable and sheath from the second positioning means, said second positioning means comprising:

(a) a housing adapted to be fixed in position, (b) a ball member connected to the exterior of such sheath member and positioned in said housing, (c) spring members positioned on opposite sides of said ball member, and (d) means to releasably secure said spring members in said housing so that said spring members and said ball member are normally positioned by said housing and so that, if the cable jams in the sheath member or the first controlled means sufficient loading of the cable by said control means will cause said ball member to bear against one of said spring members so as to cause deflection thereof and release thereof from said housing member, to thereby free the jammed cable, sheath member and ball member for push-pull motion with respect to the housing thereby freeing said control means to control the second controlled means.

7. Apparatus according to claim 6 wherein said ball member is swaged onto the sheath member which is adapted to have the cable member reeved therethrough for push-pull motion therethrough, said ball member being sized so as to be mounted in said housing to support the ball member, sheath member and cable for universal motion about the ball center.

8. Apparatus according to claim 7 wherein said spring members are flexible plate members and wherein said securing means are grooves in the housing shaped to receive at least a portion of the periphery of the spring members.

9. Apparatus according to claim 8 wherein said housing is of C-shaped cross section having an open end and including a removable bolt-type member extending across the open end of the housing to cooperate with the spring members in positioning the ball member within the housing.

10. Apparatus according to claim 9 and including a guiderail in said housing engaging said ball member to position and support the ball member for universal motion about the ball center.

11. Apparatus according to claim 9 wherein said spring member securing means is operable so that upon jamming of the cable in the sheath member or first controlled element, control means motion will cause said ball member to forcibly bear against one of the spring members and force that spring member out of its securing means so as to free the jammed cable and sheath member from the housing.

12. Releasable sheathed cable positioning means adapted to be used in a push-pull sheathed cable control system in which the sheath cable is looped and the sheath fixedly positioned at one end thereof comprising:

(A) a housing adapted to be fixed in position at the other end of the sheath, (B) a ball member connected to the exterior of such sheath and positioned in said housing, (C) spring members positioned on opposite sides of said ball member, and (D) means to releasably secure said spring members in said housing so that said spring members and said ball member are normally positioned by said housing and so that, if the cable jams anywhere in the sheath member or therebeyond in the control system, sufficient tension or compression loading of the cable will cause deformation of the cable-sheath loop portion and thereby cause said ball member to bear against one of said spring members so as to cause deflection thereof and release thereof from said housing member, to thereby free the jammed cable, sheath and ball member from the housing.

13. Apparatus according to claim 12 wherein said ball member is swaged onto the sheath and said ball is sized so as to be mounted in said housing to support the ball member, sheath and cable for universal motion about the ball center.

14. Apparatus according to claim 13 wherein said spring members are flexible plate members and wherein said securing means are grooves in the housing shaped to receive at least a portion of the periphery of the spring members.

15. Apparatus according to claim 14 wherein said housing is of C-shaped cross section having an open end and including a removable bolt-type member extending across the open end of the housing to cooperate with the spring members in positioning the ball member within the housing.

16. Apparatus according to claim 15 and including a guiderail in said housing engaging said ball member to position and support the ball member for universal motion about the ball center.

* * * * *